(No Model.)
F. B. COOK.
DISTRIBUTING FRAME FOR TELEPHONE CIRCUIT CONDUCTORS.
No. 541,152. Patented June 18, 1895.
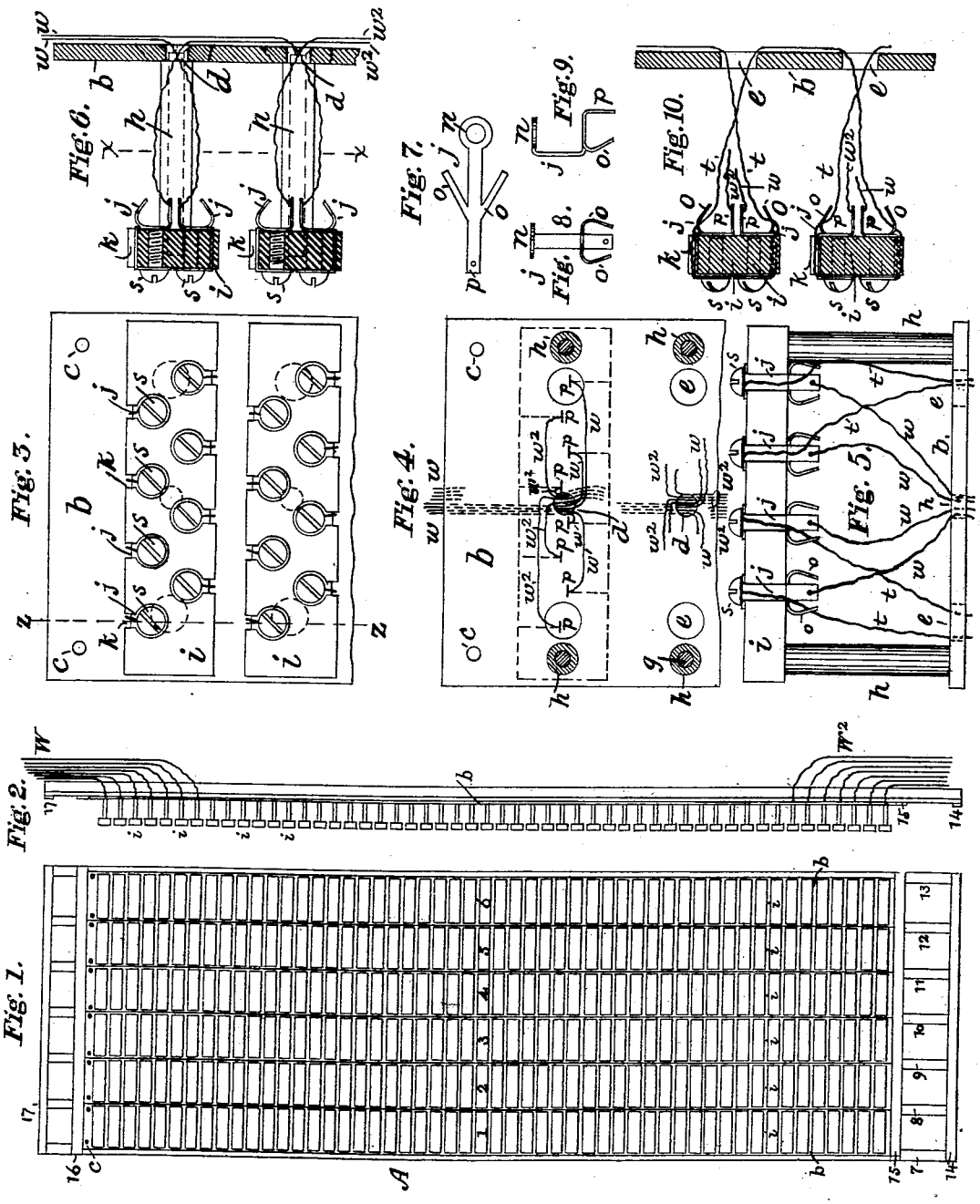

UNITED STATES PATENT OFFICE.

FRANK B. COOK, OF CHICAGO, ILLINOIS, ASSIGNOR TO THE AMERICAN BELL TELEPHONE COMPANY, OF BOSTON, MASSACHUSETTS.

DISTRIBUTING-FRAME FOR TELEPHONE-CIRCUIT CONDUCTORS.

SPECIFICATION forming part of Letters Patent No. 541,152, dated June 18, 1895.

Application filed January 9, 1895. Serial No. 534,355. (No model.)

*To all whom it may concern:*

Be it known that I, FRANK B. COOK, residing at Chicago, in the county of Cook and State of Illinois, have invented certain Improvements in Distributing-Frames for Telephone-Circuit Conductors, of which the following is a specification.

In United States Patent No. 453,863, dated June 9, 1891, to A. S. Hibbard, a system of interconnection between the street cables and switchboard cables is described, which system is adapted for use in large central offices where all of the conductors pass through the frame, the main idea being expansibility in every direction. In such system a longitudinal space is provided between the street and switchboard conductor terminals, exteriorly located, respectively, upon opposite sides of the frame. Thus the conductors of the street cable fan out to terminals located at one side of the frame, and the conductors of the switchboard cable fan out to terminals at the other side of the frame. The longitudinal space separating the sides of the frame is suitably divided into vertical and horizontal ducts through which the bridle wires from one side of the frame to the other are systematically distributed. In such an arrangement the vertical and horizontal ducts must be of such size as to readily permit the introduction of the conductors through the same even when already occupied by a large number of wires.

The object of my present invention is to provide an apparatus more suitable for and particularly applicable to smaller central offices, where space is of importance. To this end the frame is arranged to occupy the least possible space between the street conductor terminals and the switchboard conductor terminals, which are accordingly arranged vertically to one another. This idea is carried out in the way the office cables fan out their conductors. Both the street and switchboard conductors extend vertically upon the rear of the frame, the one downwardly and the other upwardly, in the same plane, and at regular intervals a group of eight conductors pass from the rear to their terminals on the front of the frame. The conductor terminals, divided in groups, are all located upon one side of the frame, being easily accessible for establishing new connections. The general idea of the whole arrangement may be summed up to be longitudinal compressibility between conductor terminals and saving of frame space.

This invention relates to the distribution of telephone and telegraph conductors at central offices by apparatus interposed between the main conductors leading to the street, usually bunched into cables, and the office conductors or cables leading to the switchboard.

The invention has especial reference to the distribution of conductors in a telephone exchange and to their arrangement in a simple but compact manner, so that they will be accessible and easily traced.

In carrying out the invention I provide a distributing appliance having as many panels as there are cables entering the central office. It is well known that such cables are composed of pairs of insulated conductors forming the two sides of metallic circuits extending between the substations and the central station, and such circuits are continued as pairs through all the switches in the switchboard. Each panel consists of an oblong metal plate or backing or support upon the face of which are rectangular blocks of insulating material connected to the said plate by supporting studs or brackets, and upon the upper and lower edges of said blocks are metal clips forming the terminals of the conductors, to which they are connected, the conductors of the street cables being connected to the clips on the lower edges and the conductors from the switchboard being connected to the clips on the upper edges of the said blocks.

The conductors from the street cables come to the rear of the panels at the top thereof and extend downward. A number of them equal to the number of clips on the lower edge of each block pass through a hole in the metal support directly under the said block and are connected to the said clips. The conductors from the switchboard come to the rear of the panels at the bottom thereof and extend upward. A number of them equal to the number of clips on the upper edge of each block pass through the same hole in the metal support as do the street cable conductors, and are connected to the said clips.

To connect a street cable conductor with any desired switchboard conductor, a connection, bridle or "jumping" wire is secured by one end under the head of the screw which holds in place the clip to which the street cable conductor is soldered. The other end of the said wire is passed through a hole in the metal support directly under the insulating block, to the rear of the panel and then carried to a similar hole in the same panel or in any other panel, through which it is passed, and brought to the front to the screw head of the clip to which the switchboard conductor required is soldered, and secured under the said screw head.

Where more than one panel is used they are fastened to a lattice frame made of iron or steel bars riveted or screwed together and provided with means for attachment to the floor or wall of the room within which the distributing appliance is located.

I will now proceed to describe and claim the said invention in detail, reference being made to the accompanying drawings, in which—

Figures 1 and 2 are respectively front and side views showing a distributing appliance embodying my invention. Figs. 3, 4, 5, 6, 7, and 10 are enlarged views in detail of a portion of one panel, showing the construction and the method of running and connecting the wires, Figs. 6 and 10 being sections in the direction of line $z\ z$, Fig. 3, and Figs. 7, 8, and 9 are views of the metal clip to which the wires are connected.

In the drawings Fig. 1 shows the front or face of a distributing appliance composed of six panels 1, 2, 3, 4, 5, and 6, illustrating the disposition of the wires from six street cables, each having two hundred conductors or one hundred pairs of conductors, secured to a lattice frame A. 7, 8, 9, 10, 11, 12, and 13 are upright bars of T or L shaped iron or steel having flat metal bars 14, 15, 16, and 17 bolted or riveted top and bottom as indicated. The panels 1, 2, 3, 4, 5, and 6 are screwed or bolted to the said frame by means of screws $c\ c$, both top and bottom.

Referring to the enlarged figures each panel consists of a metal plate or support $b$ about one-eighth of an inch thick and three inches wide. In front of the plate and at a convenient distance therefrom are rectangular insulating blocks $i$ preferably of hard vulcanized rubber secured to the support by means of screws $g$ which pass through the support from its rear side, and through the cylindrical studs $h$, the ends of the screws threading into the rear of the blocks. Upon the upper and lower edges of the blocks $i$ are metal clips $j$ secured thereto by the screws $s$, the tail piece of the clip passing over the edge of the block in the nick or channel $k$ cut therein as shown.

The construction of the clips is shown by Figs. 7, 8, and 9. They are stamped out of sheet metal in the shape shown in Fig. 7 with a circular head $n$ provided with a screw hole, and a narrow tail piece with two angular branching arms $o, o$, its terminal $p$ having a hole in which the conducting wire is secured. The tail piece is bent into three right angles as shown, while the arms $o\ o$ are bent down and away from the tail piece and serve as guides or retainers for the bridle wire. Directly under the center or axial line of the blocks $i$ are three holes in the metal support $b$ one in the center $d$, and one $e$ on each side of the center.

In Fig. 2 W represents the wires coming from the street cables and for convenience of illustration one line may represent four wires bundled together, each bundle passing through the hole $d$ in the support $b$ and as shown in detail in the other figures each separate wire $w$ connects with terminal $p$ of the clip $j$ at the lower edge of the blocks $i$.

$W^2$ in Fig. 2 represents the wires coming from the switchboard in bunches of four and passing through the holes $d$ in the metal support, and as shown in detail in the other figures the separate wires $w^2$ are connected to the terminals $p$ of the clips $j$ upon the upper edge of the blocks $i$.

To connect or link the terminal of a street conductor with the terminal of a switchboard conductor, the bared end of a piece of insulated wire $t$ is secured under the head of the screws $s$ holding the clip to which the specified wire is connected, and the wire is drawn firmly into the channel $k$ and between the guides $o\ o$ and passed through the hole $e$ in the support $b$, and then it may be carried in any direction to the hole $e$ under the block $i$ upon which the clip $j$ to which the desired switchboard conductor is secured, is located; the wire being brought up between the guides $o\ o$ of the said clip into its channel $k$, and its bared end secured under the screw head $s$ of the clip.

In linking together metallic circuits consisting of two conductors two connecting wires twisted together are used, the ends being secured as described to two street cable clips and to two switchboard clips, the two conductors being always secured to adjoining clips on the same block.

The conductors from the street and from the switchboard are kept together in bundles as they extend down and up the rear of the supporting plate and would not ordinarily need any especial fastening, and the connecting or linking wires are run in any direction that may be necessary but are not so tightly stretched but what any one covered by others could not be withdrawn.

Having now fully described my invention, I claim—

1. An appliance for transferring or interconnecting electric conductors consisting of a support or plate upon the front side of which parallel insulating blocks are secured at a suitable distance therefrom, the said blocks having upon their upper and lower edges metal conductor terminals, from which conductors extend through the said support to its rear side and there divide, all the conductors coming from the lower terminals extending in one direction, and all coming from the upper terminals extending in another direction.

2. An appliance for transferring or interconnecting electric conductors consisting of a support or plate upon the front side of which parallel insulating blocks are secured at a suitable distance therefrom, the said blocks having upon their upper and lower edges metal conductor terminals, from which conductors extend through the said support to its rear side and there divide, all the conductors coming from the lower terminals extending in one direction, and all coming from the other terminals extending in another direction, combined with interconnecting wires extending between the said upper and lower terminals through the said support or plate and across its rear side.

3. A distributing appliance for electrical conductors consisting of a support or plate having on its front a series of insulating blocks provided with metal clips upon their upper and lower edges serving as the terminals for the switchboard and street conductors respectively, the former conductors extending upward and branching to their respective terminal clips through the said support and the latter conductors extending downward and branching to their respective terminal clips through the said support.

4. A distributing appliance for electrical conductors consisting of a support or plate having on its front a series of insulating blocks provided with metal clips upon their upper and lower edges serving as the terminals for the switchboard and street conductors respectively, the former conductors extending upward and branching to their respective terminal clips through the said support, and the latter conductors extending downward and branching to their respective terminal clips through the said support, and means as described whereby any switchboard conductor terminal may be connected with any street conductor terminal.

5. A distributing appliance for electrical conductors, consisting of a plate or backing supporting on its front a series of insulating blocks, provided with metal clips upon their upper and lower edges, serving as the terminals for the switchboard and street conductors respectively, the former conductors extending upward and branching to their respective terminal clips through the said plate, and the latter conductors extending downward and branching to their respective terminal clips through the said plate, and bridle wires extending from the switchboard terminal clips through the said plate and across its rear side and through the plate again to the street conductor terminals.

In testimony whereof I have signed my name to this specification, in the presence of two subscribing witnesses, this 31st day of December, 1894.

FRANK B. COOK.

Witnesses:
VIRGINIA DIXON,
HENRY S. BULLOCK.